Nov. 10, 1931.                H. S. HANSEN                1,831,491
                          PULVERIZED COAL FEEDER
                           Filed Feb. 7, 1930           2 Sheets-Sheet 1
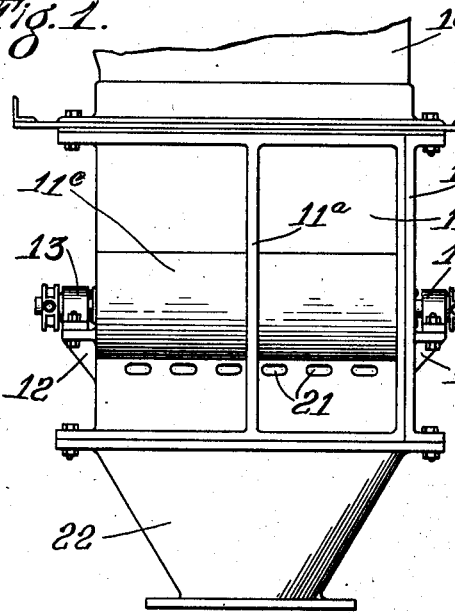
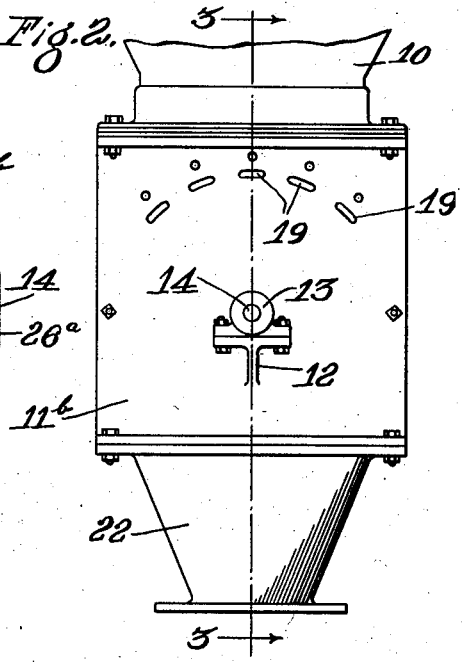
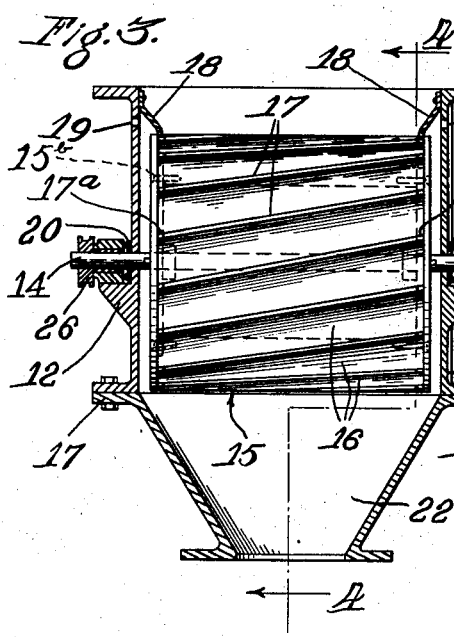
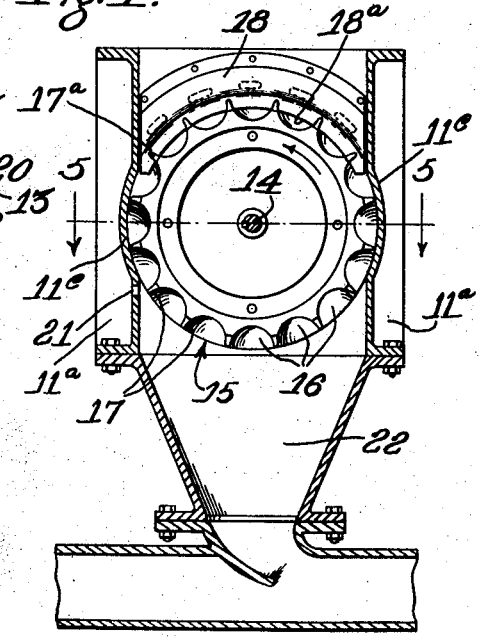
Inventor.
Hans S. Hansen.
By Dyrenforth, Lee, Chritton and Wiles
Attys.

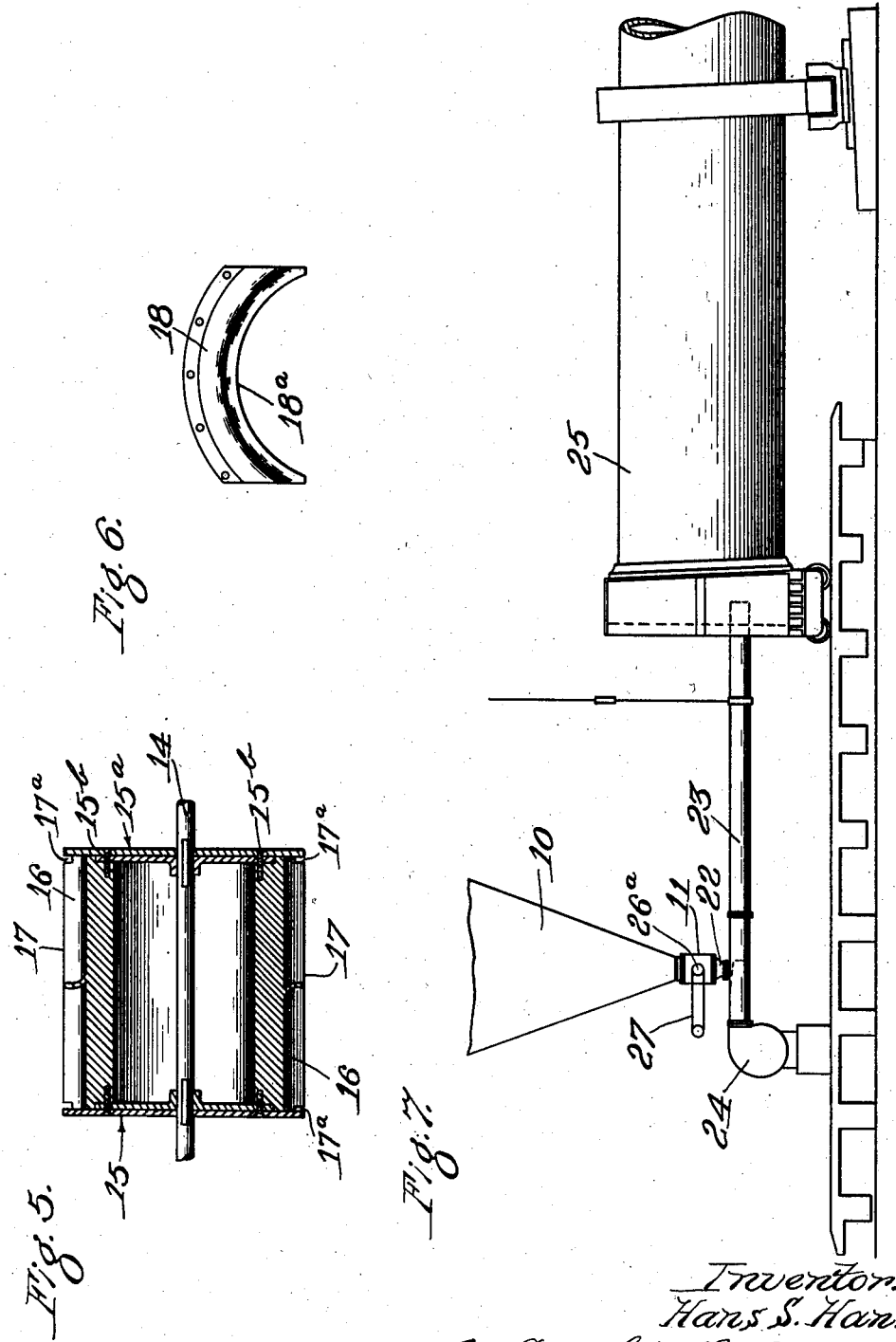

Patented Nov. 10, 1931

1,831,491

UNITED STATES PATENT OFFICE

HANS S. HANSEN, OF CHICAGO, ILLINOIS

PULVERIZED COAL FEEDER

Application filed February 7, 1930. Serial No. 426,746.

This invention relates to improvements in pulverized coal feeders and, more especially, such a feeder adapted to feed pulverized coal to a kiln, furnace, or burner for combustion.

Among the features of my invention is the provision of such a device capable of fine and exact adjustment to regulate and measure the rate of flow of the fuel.

Another feature is the elimination of the screw feeder with its accompanying disadvantages and the substitution of simple means to furnish a dependable and even flow of coal.

Another feature is found in the improved means for preventing objectionable escape of dust.

My improved feeder also controls the flow of dust into a kiln, preventing the introduction of too much at one time, thus eliminating danger of explosions.

Other features and advantages of my invention will appear more fully as I proceed with my specification.

In that form of device embodying the features of my invention shown in the accompanying drawings—

Figure 1 is a view in front elevation; Fig. 2 is a view in side elevation; Fig. 3 is a view taken as indicated by the line 3 of Fig. 2; Fig. 4 is a view taken as indicated by the line 4 of Fig. 3; Fig. 5 is a horizontal sectional view taken as indicated by the line 5 of Fig. 4; Fig. 6 is a view in side elevation of one of the dust shields showing the same removed from the feeder; and Fig. 7 is a view in side elevation on a reduced scale showing the feeder in use with a cement kiln.

As shown in the drawings, the feeder includes a hopper 10 mounted on top of a substantially cubical feeder housing casting 11 open at the top and bottom, said housing being strengthened by ribs 11$^a$ and provided with a removable side 11$^b$ to permit removal of the feeder drum from the housing.

Numerals 12, 12 indicate bearing lugs on the sides of the housing 11, one being carried by the removable side 11$^b$. These lugs support the bearings 13, 13 in which is rotatably mounted the shaft 14 carrying the feeder drum indicated, in general, by 15.

The drum 15 is hollow as shown and provided with sixteen pockets 16 on its surface, each of said pockets 16 being substantially semi-cylindrical in shape and slanted from 20° to 25°. That is, the ends of the pockets at one side of the drum are rotated from 20° to 25° with respect to the ends at the other side of the drum. This angular arrangement of the pockets insures a continuous flow of fuel. The division walls between the pockets are indicated by 17, 17 and these are provided at their ends with notches 17$^a$ to accommodate the lower edges of the dust shields to be hereinafter described. The drum ends 15$^a$ are fastened onto the barrel by means of the screws 15$^b$.

Numerals 18, 18 indicate dust shields at the top of the drum housing 11 at the sides, with their lower edges 18$^a$ extending into the notches 17$^a$ in the ends of the partitions 17, said dust shields serving to prevent coal or dust from falling down between the ends of the drum and the sides of the drum housing. Numerals 19, 19 indicate air suction holes in the sides of the casing 11 behind the dust shields 18, said holes furnishing air currents to carry away any dust that might get under the shields and prevent it from resting on the shaft 14.

Numerals 20, 20 indicate felt washers to prevent grease from the shaft bearings entering the housing 11.

Numerals 21, 21 indicate air suction holes in the wall of the housing 11 adjacent the discharge side of the drum 15 which is rotated in the direction indicated by the arrow in Fig. 4. Air entering these holes helps to start the free flow of dust and prevents any of it from sticking in the pockets. Below the housing 11 is arranged the discharge spout 22 of the feeder designed to discharge fuel into a blower pipe 23 supplied with air pressure from a blower 24 and leading to the combustion space of a furnace, or, for example, cement kiln 25. A reltively high velocity of air is preferably set up in the blower pipe to create a suction inside of the feeder and cause atmospheric air to enter the air suction holes 19 and 21 for the purposes heretofore explained.

The walls of the housing 11 in the center adjacent the sides of the drum 15 are preferably rounded outwardly somewhat, as indicated by 11$^c$, and the discharge of coal from the pockets takes place adjacent the holes 21 as the pockets emerge from the curved portion 11$^c$.

The drum may be rotated by any suitable means, a pulley 26$^a$ being provided to receive the belt 27. A variable speed drive (not shown) is preferably provided to regulate the rate of rotation of the drum. Set collars 26 are provided to keep the drum in place.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I regard as new, and desire to secure by Letters Patent, is:

1. A device of the character described including, a housing having an inlet opening at the top and a discharge opening at the bottom, and a substantially cylindrical horizontal drum rotatably mounted in the housing, said drum substantially obstructing free flow through the housing from the inlet opening to the discharge opening, and provided with coal carrying pockets in its periphery, the wall of the housing on the discharge side of the drum being provided with air suction holes adjacent the point of discharge of the pockets.

2. A device of the character described including, a housing having an inlet opening at the top and a discharge opening at the bottom, and a substantially cylindrical horizontal drum rotatably mounted in the housing, said drum substantially obstructing free flow through the housing from the inlet opening to the discharge opening, and provided with generally longitudinal coal carrying pockets in its periphery, the sides of the housing being provided with depending dust shields above the drum, and the partitions between the pockets on the drum being provided with notches at their ends accommodating the lower edges of said shields.

3. A device of the character described including, a housing having an inlet opening at the top and a discharge opening at the bottom, and a substantially cylindrical horizontal drum rotatably mounted in the housing, said drum substantially obstructing free flow through the housing from the inlet opening to the discharge opening, and provided with coal carrying pockets in its periphery, the sides of the housing being provided with depending dust shields above the drum and air suction holes behind the dust shields.

In witness whereof, I have hereunto set my hand this 5th day of February, 1930.

HANS S. HANSEN.